United States Patent [19]

Rossmiller et al.

[11] 4,049,062
[45] Sept. 20, 1977

[54] SWING MOUNT PIVOTALLY SUPPORTING WIDTH GAUGE FROM VEHICLE

[76] Inventors: Lawrence E. Rossmiller; George D. Gemar, both of Brady, Mont. 59416

[21] Appl. No.: 608,236

[22] Filed: Aug. 27, 1975

[51] Int. Cl.² .............................................. A01B 35/32
[52] U.S. Cl. .................................... 172/126; 172/132; 403/53
[58] Field of Search .............. 172/126, 127, 128, 129, 172/132; 239/159, 160, 161, 162, 163, 164, 165, 166, 167, 168, 169, 170; 111/33; 248/282; 403/53, 62, 113, 117

[56] References Cited

U.S. PATENT DOCUMENTS

| 555,538 | 3/1896 | Steel et al. | 172/132 |
|---|---|---|---|
| 985,643 | 2/1911 | Turner | 172/129 |
| 1,025,040 | 4/1912 | Woods et al. | 172/132 |
| 1,183,987 | 5/1916 | Kelley | 172/129 |
| 2,341,146 | 2/1944 | Kriegbaum et al. | 172/127 |
| 2,483,011 | 9/1949 | Hudson | 172/127 |
| 2,602,684 | 7/1952 | Pinke | 403/53 |
| 2,690,355 | 9/1954 | Waters et al. | 239/168 |
| 2,995,307 | 8/1961 | McMahon | 239/161 |
| 3,447,750 | 6/1969 | Weston | 239/167 |
| 3,544,009 | 12/1970 | Schlueter | 239/167 |
| 3,556,404 | 1/1971 | Walker | 239/167 |

Primary Examiner—Richard T. Stouffer
Attorney, Agent, or Firm—Clarence A. O'Brien; Harvey B. Jacobson

[57] ABSTRACT

A mount is supported at the forward portion of a farm tractor or the like adapted to pull draft implements therebehind and the mount is swingable about an upstanding axis for angular displacement between opposite limit positions with a mounting portion of the mount spaced laterally of the aforementioned axis disposed at opposite sides of the forward portion of the vehicle. An elongated horizontal arm having base and free ends is supported at its base end from the mounting portion for angular displacement relative thereto about an upstanding axis and with the arm swingable between a horizontal laterally outwardly projecting position and a trailing position when the mounting portion is disposed at either side of the vehicle. The outer free end of the arm may include a depending guide marker for close registry with the adjacent side of the last path of movement of a wide implement being pulled behind the vehicle and the arm is adjustable in effective length whereby the path of movement of the towed implement may be maintained immediately adjacent the near side of the last path of movement of the implement.

3 Claims, 6 Drawing Figures

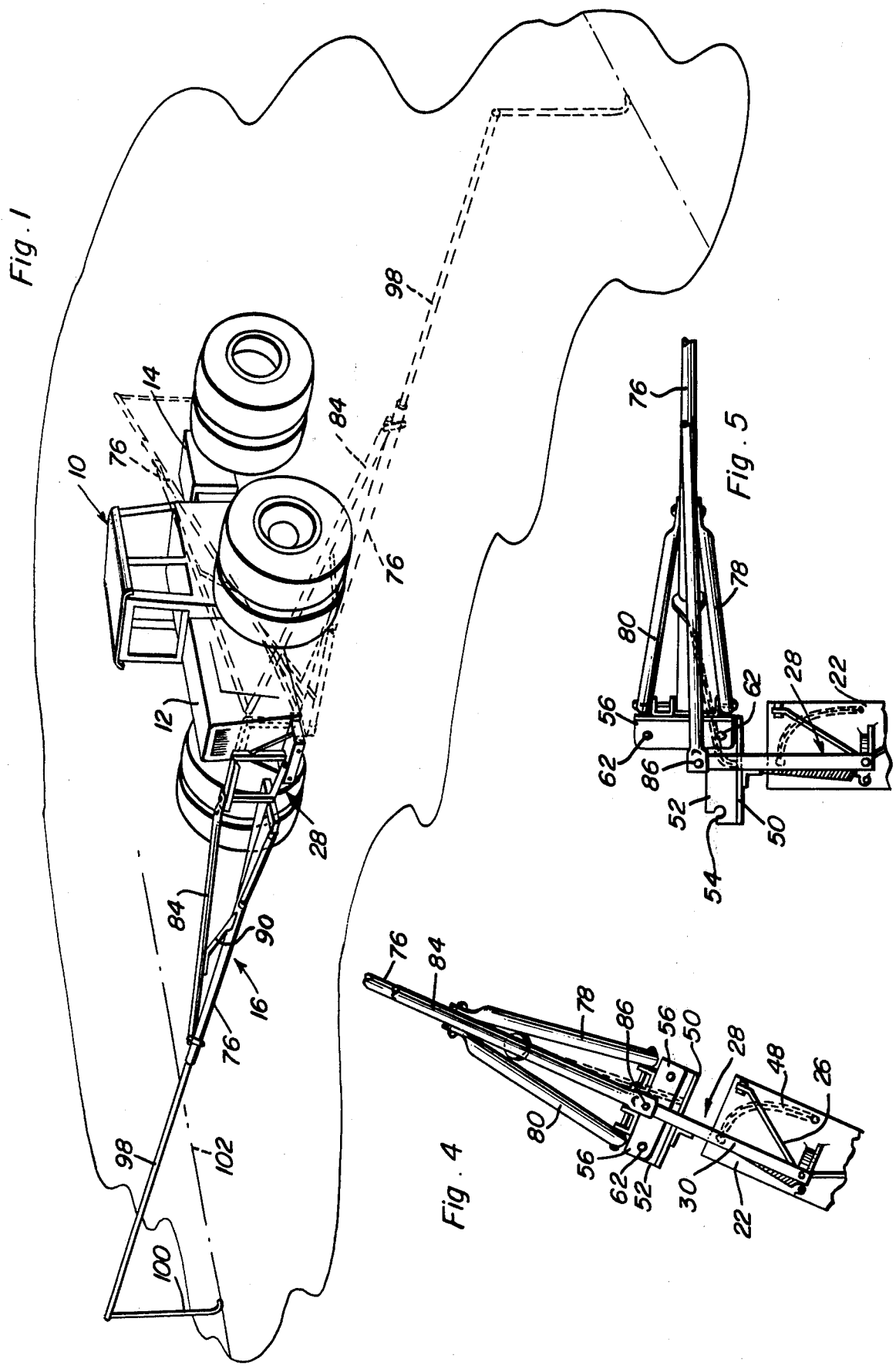

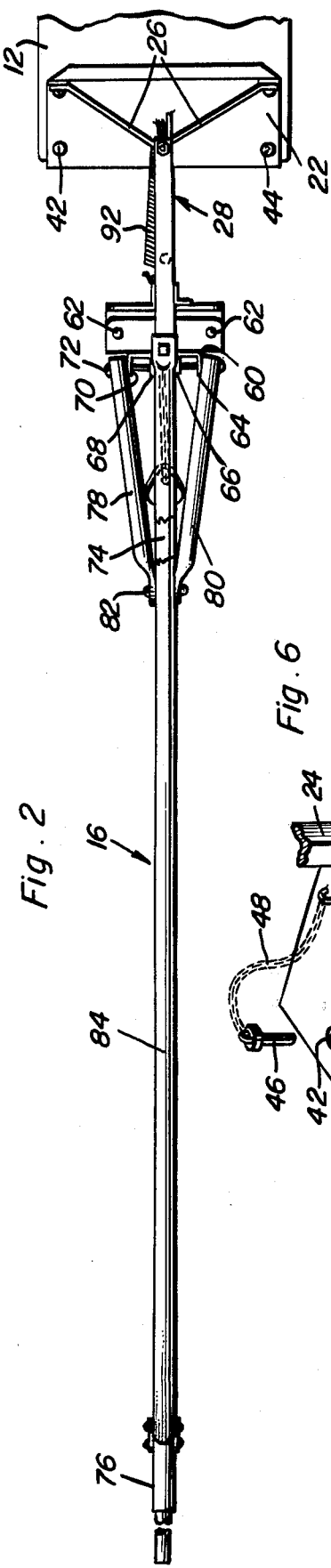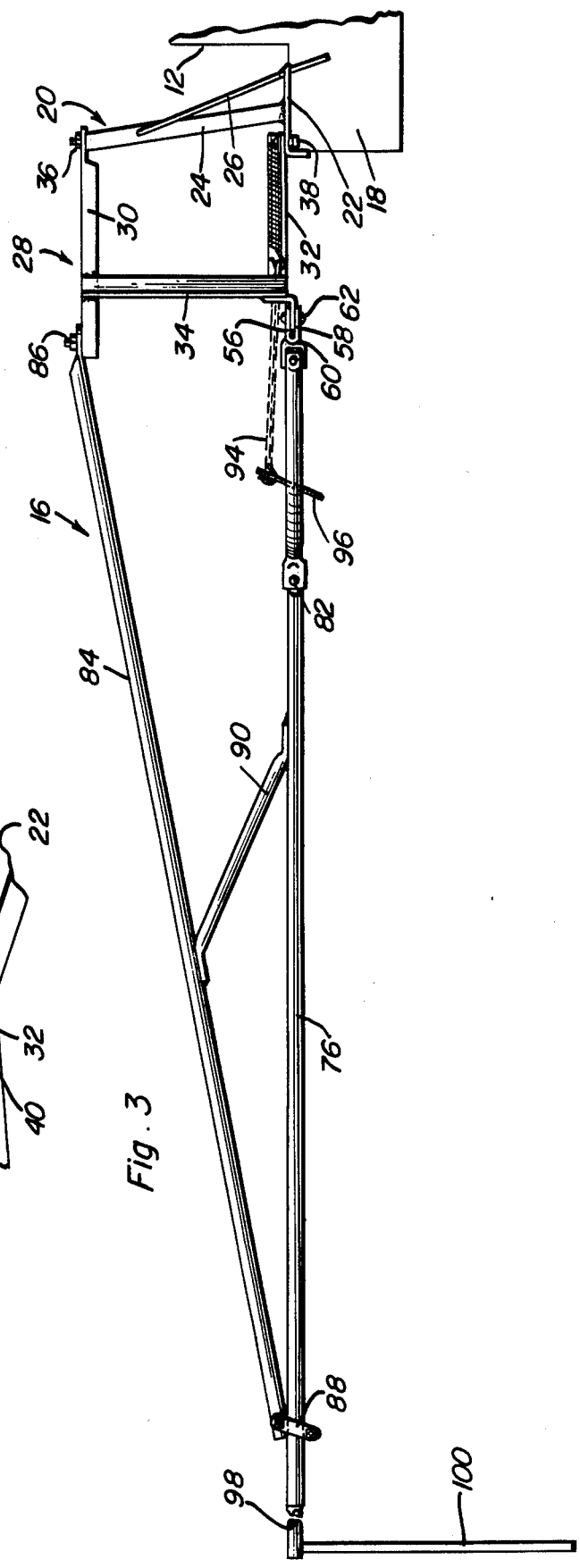

SWING MOUNT PIVOTALLY SUPPORTING WIDTH GAUGE FROM VEHICLE

BACKGROUND OF THE INVENTION

Various types of tractor mounted row markers swingable from one side of the tractor to another have been heretofore designed, some of which previous devices are disclosed in U.S. Pat. Nos. 188,624, 1,616,099, 2,341,146, 2,483,011, 2,850,958, 3,762,482 and 3,774,690. However, some of these previous row markers may not be swung to a trailing position disposed along one side of the tractor during transport of the latter from one location to another and other previously known row markers may not be readily swung from one side of the tractor to the other. Still further, some previously known row markers require mounting at the rear of the associated tractor and, therefore, are not readily observed by the operator of the associated tractor unless the operator turns his head fully to one side.

BRIEF DESCRIPTION OF THE INVENTION

The row marker of the instant invention may be mounted on the front of the associated farm tractor or other similar vehicle, readily swung from one side of the tractor to the other and may also be swung to a trailing position exending rearwardly along either side of the tractor during transport of the latter from one location to another. Accordingly, the row marker or gauge of the instant invention constitutes an improvement over the devices disclosed in the above noted prior patents insofar as the use and operation of the gauge is concerned.

The main object of this invention is to provide a row marker or gauge for use on a farm tractor or similar device to enable the operator of the tractor to accurately control the path of movement of the tractor and implement assembly towed therebehind in relation to the last adjacent path of movement of the tractor and implement assembly.

Another object of the invention, in accordance with the immediately preceding object, is to provide a tractor gauge or row marker which may be readily swung from one side of the tractor to the other.

Yet another object of this invention is to provide a tractor gauge which may also be readily swung to a trailing position extending rearwardly along either side of the associated tractor.

Still another important object of this invention is to provide a row marker or tractor gauge which is adjustable in length.

A further object of this invention is to provide a row marker designed specifically for mounting solely from the forward end portion of the associated tractor.

Another object of this invention is to provide a row marker which may be readily modified for support from substantially all types of farm tractors.

A final object of this invention to be specifically enumerated herein is to provide a row marker in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a heavy duty farm tractor with the gauge structure of the instant invention operatively associated therewith and the support arm of the gauge structure projecting laterally outwardly from the right hand side of the tractor, a first alternate position of the gauge projecting outwardly from the left side of the tractor as well as a second alternate position of the gauge disposed in trailing position along the left side of the tractor being illustrated in phantom lines;

FIG. 2 is a top plan view of the tractor gauge as mounted on the front end of the tractor and with the gauge extending forwardly of he tractor;

FIG. 3 is a side elevational view of the assemblage illustrated in FIG. 2;

FIG. 4 is a fragmentary plan view of the tractor gauge projecting laterally outwardly of the right side of the tractor;

FIG. 5 is a fiagmentary plan view of the tractor gauge disposed in a trailing position along the right hand side of the tractor; and FIG. 6 is a fragmentary perspective view illustrating portions of the coacting structure by which the base end of the arm portion of the gauge is pivotally supported from the associated tractor.

DETAILED DESCRIPTION OF THE INVENTION

Referring now more specifically to the drawings, the numeral 10 generally designates a conventional form of heavy duty tractor including front and rear portions 12 and 14. The gauge construction of the instant invention is referred to in general by the reference numeral 16 and is mounted from the forward end portion 12 of the tractor 10 in a manner to be hereinafter more fully set forth. The specific type of tractor with which the gauge construction is used is of little importance, inasmuch as the gauge construction may be readily provided with a mount for attachment to the forward portion of substantially any type of tractor or other vehicle.

The forward end portion 12 of the tractor 10 includes a structure 18 suitable for mounting purposes and which may vary in configuration from one tractor to another.

The gauge construction 16 includes a mounting bracket or base referred to in general by the reference numeral 20 including a base plate 22 overlying and secured to the structure 18 in any convenient manner. An upright 24 has its lower end fixedly secured to a transverse mid-portion of the base plate 22 and is forwardly inclined at its upper end. In addition, a pair of opposite side inclined bracing bars 26 are secured to and extend between rear opposite side corner portions of the base plate 22 and opposite side upper end portions of the upright 24.

A mount frame referred to in general by the reference numeral 28 is provided and includes a pair of generally parallel horizontal upper and lower members 30 and 32 interconnected at one pair of corresponding ends by means of a vertical member 34 extending and secured therebetween. The other pair of ends of the members 30 and 32 are pivotally supported from the upper end of the upright 24, as at 36, and a central forward portion of the base plate 22, as at 38, whereby the mount frame 28 may be swung horizontally about the vertically spaced and aligned pivot points 36 and 38 between positions with the vertical member 34 disposed at opposite sides of the forward end portion 12 of the tractor 10. The lower member 32 includes an aperture 40 formed therethrough adjacent the vertical member 34 and the opposite side forward corner portions of the base plate 22 include apertures 42 and 44 with which the aperture 40 is alternately registrable upon swinging of the mount frame 28 from one side of the forward portion 12 to the other side thereof. Also, a locking pin 46 is tethered to the base plate 22 by means of an elongated flexible member 48 and is receivable through the aperture 40 as well as whichever aperture 42 and 44 the aperture 40 is registered. Accordingly, the mount frame 28 may be releasably secured in position swung to either side of the forward end portion 12 of the tractor 10.

The outer side of the lower end of the vertical member 34 has a horizontal transverse angle bracket 50 secured thereto disposed at substantially right angles to the lower member 32 and including an outwardly projecting horizontal flange 52 whose opposite ends are notched, as at 54. A channel member 56 is provided, including spaced upper and lower flanges 56 and 58 interconnected along one pair of corresponding edges by means of a bight portion 60 and the channel member 56 is slipped over the flange 52 with the latter slidingly received between the opposing surfaces of the flanges 56 and 58. In addition, a pair of abutment pins 62 are secured through the opposite ends of the flanges 56 and 58 and are feedingly receivable in the notches 54. The bight portion 60 includes outstanding apertured mounting lugs 64, 66, 68 and 70 supported therefrom with the apertures thereof aligned with each other and a pivot shaft 72 is secured through the mounting lugs 64, 66, 68 and 70.

The base end portion 74 of an elongated horizontal arm 76 is received between the mounting lugs 66 and 68 and the pivot shaft 72 passes therethrough. Also, a pair of diagonal braces 78 and 80 are provided for the base end portion 74 of the arm 76 and one end of the brace 78 is mounted on the pivot shaft 72 outwardly of the mounting lug 70 while a corresponding end of the brace 80 is mounted on the opposite end of the pivot shaft 72 outwardly of the mounting lug 64. The other ends of the braces 78 and 80 converge toward and are secured to opposite side portions of the arm 76 by means of a fastener 82 secured through the braces 78 and 80 and the arm 76. Also, the arm 76 includes a longitudinal brace 84 having one end thereof pivotally supported from the end portion of the upper member 30 above the angle bracket 50, as at 86, and the other end of the brace 84 is secured to the outer end portion of the arm 76, as at 88, the mid-portions of the brace 84 and the arm 76 having a further bracing member 90 secured therebetween.

An elongated expansion spring 92 is provided and has one end thereof anchored to the base plate 22 at the point 38 of pivotal connection of the lower member 32 to the base plate 22 and the other end of the spring 92 has one end of a flexible chain 94 anchored thereto, the chain 94 passing through an opening (not shown) provided therefor in the angle bracket 50 and having its other end secured to a slidable jamb-type anchor plate 96 shiftable along the base end portion 74 of the arm 76. In this manner, tension of the expansion spring 92 may be adjusted.

It will be noted that the outer end of the arm 76 includes a lengthwise outwardly extendible section 98 and that the outer end of the section 98 includes a depending flexible guide or gauge member 100.

In operation, the base plate 22 is secured to the structure 18 in the manner hereinbefore set forth and the mount frame 28 may thereafter be secured in position extending transversely of the vehicle 10 with the vertical member 34 disposed to one side of the vehicle 10. From FIG. 1 of the drawings, it may be seen that the mount frame 28 has been swung to and releasably secured in position at the right side of the vehicle 10 and that the arm 76 projects endwise outwardly from the mount frame 28 with the member 100 registered with a path 102 disposed outwardly of the right side of the vehicle 10 and substantially paralleling the longitudinal center line of the vehicle 10. As the tractor 10 pulls a wide implement therebehind, the member 100 and its registry with the path 102 will enable the driver of the tractor 10 to insure that the implement being pulled will pass closely along the path 102. Should the arm 76 strike a fence post or the like, the arm 76 will merely swing rearwardly in the manner illustrated in FIG. 5 with the rear pin 72 remaining seated in the associated notch 54, but with the forward pin 62 swung outwardly of the forward notch 54. Also, when it is desired to swing the gauge construction 16 to the left side of the tractor 10, it is merely necessary to remove the pin 46 and to thereafter swing the arm 76 as well as the mount frame 28 to the left side of the tractor after which the pin 46 is again inserted through the aperture 40 and also through the aperture 44. Still further, if it is desired to transport the tractor 10 from one location to another, it may be seen from FIG. 1 of the drawings that the arm 76 may be swung to a full trailing position and that the forward and outward displacement of the pivot point 86 relative to the pin 62 about which the arm 76 is to be swung causes the arm 76 to swing about a forwardly and outwardly upwardly inclined axis whereby the free end of the arm 76 is elevated as the arm is swung from a horizontally outwardly projecting position to a rearwardly directed trailing position. Accordingly, even though the base end portion of the arm 76 is mounted from a lower forward portion of the tractor 10, the intermediate portion of the arm 76 will be elevated above the wheels of the tractor 10 when the arm 76 is swung to the trailing position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle to be used in pulling wide trailing structures, a width gauge comprising an upstanding mount frame including remote horizontally spaced inner base and outer free marginal portions, a central forward portion of said vehicle including mounting means mounting said frame at said base marginal portion thereof for oscillation of said frame relative to said vehicle about a first upstanding axis between positions with said free marginal portion disposed adjacent and facing outwardly of opposite sides of said vehicle, an elongated horizontal arm having an inner base end and an outer free end, said base end of said arm and free marginal portion of said frame including first coacting means pivotally supporting an upper portion of said base end from an upper portion of said free marginal portion to define an upstanding upper pivot connection, said free marginal portion including first and second lower mounting portions spaced horizontally apart on opposite sides of the medial plane of said frame and inwardly of said first coacting means in the direction of said inner base marginal portion, said base end portion including first and second lower support portions spaced horizontally apart on opposite sides of said arm, said first mounting and support portions and said second mounting and support portions defining releasably and alternately engageable means defining first and second upstanding lower pivot connections, respectively, on opposite sides of said arm and frame, said first coacting means and said lower mounting and support portions collectively defining a shiftable upstanding axis to be canted between positions alternately aligning said first coacting means with said first and second lower pivot connections to respectively define oppositely inclined axes about which said arm may be oppositely swung relative to said frame from a horizontal center position projecting outwardly from said free marginal portion toward rearwardly and upwardly inclined positions extending along said opposite sides of said vehicle, when said free marginal portion of said frame is disposed at said opposite sides of said vehicle.

2. The combination of claim 1 including means operative to releasably retain said mount in position with said mounting portion disposed at either side of said vehicle.

3. The combination of claim 1 including means connected between said arm and vehicle yieldingly biasing said arm to said center position independent of the shifted position of said free marginal portion of said mount frame relative to said vehicle.

* * * * *